US006852063B2

(12) United States Patent
Takahashi et al.

(10) Patent No.: US 6,852,063 B2
(45) Date of Patent: Feb. 8, 2005

(54) AUTOMOTIVE INTERNAL COMBUSTION ENGINE CONTROL SYSTEM

(75) Inventors: Tsukasa Takahashi, Saitama (JP);
Yorinori Kumagai, Saitama (JP);
Chihiro Matsubara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/291,483

(22) Filed: Nov. 12, 2002

(65) Prior Publication Data

US 2003/0104900 A1 Jun. 5, 2003

(30) Foreign Application Priority Data

Nov. 30, 2001 (JP) ........................................ 2001-366436

(51) Int. Cl.[7] .............................. B60K 41/02; F16H 3/72
(52) U.S. Cl. ............................................. 477/5; 475/5
(58) Field of Search ........................... 477/3, 4, 5; 475/5

(56) References Cited

U.S. PATENT DOCUMENTS

| | | | | |
|---|---|---|---|---|
| 5,558,173 A | * | 9/1996 | Sherman .................... | 180/53.8 |
| 6,048,288 A | * | 4/2000 | Tsujii et al. .................. | 477/5 |
| 6,302,227 B1 | * | 10/2001 | Takemura et al. ......... | 180/65.2 |
| 6,478,705 B1 | * | 11/2002 | Holmes et al. ................ | 475/5 |
| 6,524,217 B1 | * | 2/2003 | Murakami et al. ............. | 477/5 |
| 2003/0199352 A1 | * | 10/2003 | Tsai et al ...................... | 475/5 |

FOREIGN PATENT DOCUMENTS

| | | | |
|---|---|---|---|
| JP | 09014385 A | * | 1/1997 |
| JP | 11-230012 | | 8/1999 |

* cited by examiner

*Primary Examiner*—Roger Pang
(74) *Attorney, Agent, or Firm*—Westerman, Hattori, Daniels & Adrian LLP (57) ABSTRACT

An automotive internal combustion engine control system transmits the output of a starting motor capable of operating as a generator to an internal combustion engine in starting the internal combustion engine, and transmits the output of the internal combustion engine to accessories while the internal combustion engine is in operation. The automotive internal combustion engine control system includes a transmission mechanism that transmits the output of the starting motor to the accessories while the internal combustion engine is stopped for a predetermined condition, transmits the rotation of the drive shaft of the starting motor to the crankshaft of the internal combustion engine at a high first gear ratio in starting the internal combustion engine, and transmits the rotation of the crankshaft of the internal combustion engine to the drive shaft of the starting motor at a low second gear ratio while the internal combustion engine is in operation to operate the starting motor as a generator. The transmission mechanism enables driving the accessories by the starting motor while the internal combustion engine is stopped, smoothly starting the internal combustion engine and efficient energy regeneration while the internal combustion engine is in operation.

11 Claims, 7 Drawing Sheets

AUTOMOTIVE INTERNAL COMBUSTION ENGINE CONTROL SYSTEM

BACKGROUND OF THE INVENTION

1. Technical Field

The present invention relates to a control system for controlling power transmission from a starter motor to an internal combustion engine for a vehicle, such as an automobile, and power transmission from the internal combustion engine to an accessory.

2. Description of the Related Art

A technique for temporarily stopping an internal combustion engine when a vehicle provided with the internal combustion engine is stopped, for example, to wait for the traffic lights to change has been practiced to reduce the fuel consumption of the internal combustion engine. Generally, an accessory, such as an air conditioner, stops when the internal combustion engine is stopped and, consequently, a heated atmosphere in the passenger compartment makes the passenger compartment uncomfortable.

Techniques for driving accessories by a motor when the internal combustion engine is stopped have been proposed. A technique proposed to prevent useless power consumption in JP-A No. 230012/1999 drives a motor for rotation in the normal direction to start a stopping internal combustion engine and disconnects the motor from an accessory to stop transmitting torque to the accessory, and drives the motor for rotation in the reverse direction to drive the accessory while the internal combustion engine is stopped and disconnects the motor from the internal combustion engine to stop transmitting torque from the motor to the internal combustion engine.

The prior art, however, does not use the motor both as a driving device and a generator, and does not use the motor for power regeneration.

It would be wiser for the automobile that operates the air conditioner while the internal combustion engine is stopped temporarily to regenerate energy that can be recovered because the power consumption of the air conditioner is large.

In a hybrid car provided with both an internal combustion engine and an electric motor as driving means, energy regeneration while the car is decelerated is indispensable in view of energy efficiency.

SUMMARY OF THE INVENTION

The present invention has been made in view of the foregoing problems and it is therefore an object of the present invention to provide an automotive internal combustion engine control system that uses a starting motor both as a generator and for starting an internal combustion engine, drives an accessory by the starting motor while the internal combustion engine is stopped, and is capable of smoothly starting the internal combustion engine and of efficiently regenerating energy while the internal combustion engine is in operation.

According to the present invention, an automotive internal combustion engine control system comprises: a transmission mechanism that transmits output of a starting motor to an internal combustion engine to start the internal combustion engine, transmits output of the internal combustion engine to an accessory while the internal combustion engine is in operation, and transmits output of the starting motor to the accessory while the internal combustion is stopped for a predetermined condition; wherein the starting motor is capable of serving as a generator, a controller controls the transmission mechanism to transmit rotation of a drive shaft included in the starting motor to a crankshaft included in the internal combustion engine at a high first gear ratio in starting the internal combustion engine, and to transmit rotation of the crankshaft of the internal combustion engine to the drive shaft of the starting motor at a low second gear ratio while the internal combustion engine is in operation, and the starting motor serves as a generator when the rotation of the crankshaft of the internal combustion engine is transmitted to the drive shaft of the starting motor at the second gear ratio.

The automotive internal combustion engine control system transmits the output of the starting motor to the accessory while the internal combustion engine is stopped for a predetermined condition, and transmits the rotation of the starting motor to the internal combustion engine at the high first gear ratio in starting the internal combustion engine. Thus a driving force obtained by multiplying the output driving force of the starting motor by the high gear ratio can be used for starting the internal combustion engine and hence the starting motor may be of a small capacity.

Since the output power of the internal combustion engine is transmitted to the starting motor at a low second gear ratio to use the starting motor as a generator, energy can be efficiently regenerated.

In the automotive internal combustion engine control system according to the present invention, the transmission mechanism may comprise: a planetary gearset including a helical sun gear connected to the starting motor, helical planet pinions, a helical ring gear connected through a one-way clutch to a stationary member, and a planet-pinion carrier carrying the planet pinions and connected to the crankshaft of the internal combustion engine; and a centrifugal clutch that engages the planet pinion carrier and the ring gear by the agency of centrifugal force generated by weights, and disengages the planet pinion carrier and the ring gear from each other by thrust force generated by the helical gears.

In the automotive internal combustion engine control system according to the present invention, the transmission mechanism may comprise: a planetary gearset including a helical sun gear connected to the starting motor, helical planet pinions, a helical ring gear connected through a one-way clutch to a stationary member, and a planet-pinion carrier carrying the planet pinions and connected to the crankshaft of the internal combustion engine; and a centrifugal clutch that engages the planet pinion carrier and the sun gear by he agency of centrifugal force acting on weights, and disengages the planet pinion carrier and the sun gear from each other by thrust force generated by the helical gears.

Since the transmission mechanism is a mechanical module including the planetary gearset and the centrifugal clutch, the internal combustion engine control system is simple and convenient.

The automotive internal combustion engine control system according to the present invention may further comprise a controllable braking means placed between the one-way clutch and the stationary member; wherein the controllable braking means may intercept the transmission of the output of the starting motor to the internal combustion engine while the internal combustion engine is stopped for a predetermined condition.

The interception of transmission of the output of the starting motor to the internal combustion engine while the internal combustion engine is stopped for a predetermined condition reduces fuel consumption and enables the starting motor to drive an accessory, such as an air conditioner.

The automotive internal combustion engine control system according to the present invention may further comprise a deceleration regeneration means for locking the ring gear by forcibly disengaging the centrifugal clutch; wherein the deceleration regeneration means transmits the rotation of the crankshaft of the internal combustion engine to the drive shaft of the starting motor at the high first gear ratio while the vehicle is being decelerated to use the starting motor as a generator for regeneration.

Since the deceleration regeneration means transmits the rotation of the crankshaft of the internal combustion engine to the drive shaft of the starting motor at the high first gear ratio while the vehicle is being decelerated to use the starting motor as a generator for regeneration, a large quantity of energy can be regenerated.

DESCRIPTION OF THE PREFERRED EMBODIMENTS

An automotive internal combustion engine control system in a first embodiment of the present invention will be described with reference to FIGS. 1 to 3.

Figure 1:
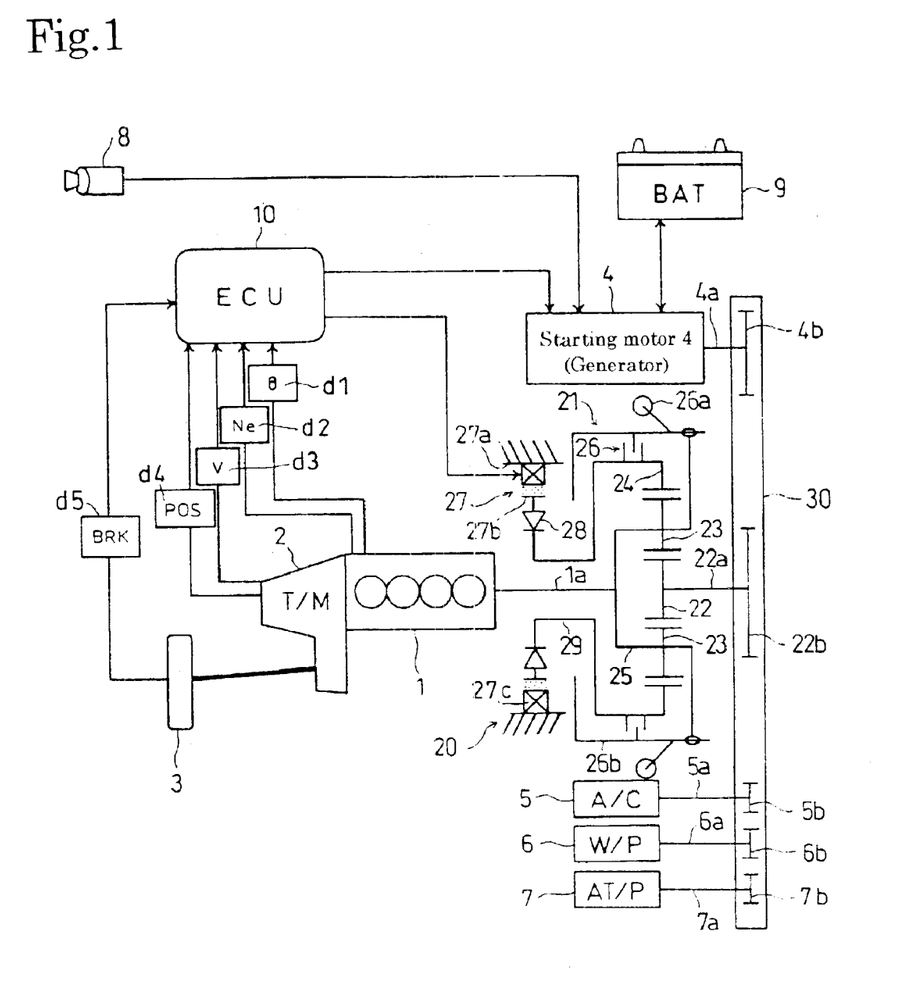
FIG. 1 is a diagrammatic view of an automotive internal combustion engine control system in a first embodiment according to the present invention.

Referring to FIG. 1 showing an automotive internal combustion engine control system in the first embodiment, an internal combustion engine 1 included in a vehicle drives drive wheels 3 for traveling through a transmission 2. A starting motor 4 capable of serving as a generator starts the internal combustion engine 1. The internal combustion engine 1 is provided with auxiliary machinery including a water pump 6 for pumping cooling water for cooling the internal combustion engine 1, and an oil pump 7 for an automatic transmission, and drives an air conditioner 5.

An ignition switch 8 is operated to drive the starting motor 4 by supplying power stored in a battery 9 to the starting motor 4. When the starting motor 4 serves as a generator to regenerate energy, the battery 9 is charged by energy generated by the starting motor 4.

Sensors d1, d2, d3, d4 and d5 sense throttle angle θ, engine speed Ne, traveling speed V, shift position POS of the transmission 2, foot brake condition BRK indicating the operating condition of the vehicle, respectively, and give input signals representing measured values to a central processing unit (ECU) 10. The ECU 10 processes the input signals and executes necessary control operations.

A transmission 20 is placed between the crankshaft 1a of the internal combustion engine 1 and the drive shaft 4a of the starting motor 4. The transmission 20 includes, in combination, a planetary gearset 21, a centrifugal clutch 26, and an electromagnetic brake 27, which is an electromagnetic powder brake in this embodiment.

The planetary gearset 21 comprises a sun gear 22, a ring gear 24 coaxial with the sun gear 22, planet pinions 23 disposed between and engaged with the sun gear 22 and the ring gear 24, and a planet pinion carrier 25 supporting the planet pinions 23 for rotation. The planet pinions 23 rotate on the planet pinion carrier 25 and revolve around the sun gear 22.

A clutch guide 26b and the planet pinion carrier 25 are engaged by splines. The clutch guide 26b is axially movable relative to the planet pinion carrier 25. A centrifugal clutch 26 is interposed between the clutch guide 26b and the ring gear 24.

The centrifugal clutch 26 is provided with swing weights 26a pivotally supported on the clutch guide 26b for revolution together with the planet pinion carrier 25 and the clutch guide 26b. When the swing weights 26a are turned radially outward by centrifugal force, the clutch guide 26b is shifted in a first axial direction for engaging the centrifugal clutch 26.

The sun gear 22, the planet pinions 23 and the ring gear 24 are helical gears and are engaged with each other. The sun gear 22, the planet pinions 23 form a helical gear train. Thrust force generated in the helical gear train acts on the ring gear 24 so as to shift the ring gear 24 relative to the sun gear in a second axial direction relative to the sun gear 22 to disengage the centrifugal clutch 26.

The centrifugal clutch 26 is engaged by the movement of the clutch guide 26b in the first axial direction caused by the centrifugal force acting on the swing weights 26a when the planet pinion carrier 25 rotates at a rotating speed not lower than a predetermined rotating speed. The centrifugal clutch 26 is disengaged when the ring gear 24 is moved in the second axial direction by the thrust force generated in the helical gear train.

When the centrifugal clutch 26 is engaged, the planet pinion carrier 25 and the ring gear 24 are locked together by the clutch guide 26b and the planet pinions 23 are unable to rotate. Consequently, the planetary gearset 21 is locked and is rotated.

The electromagnetic brake 27 includes a stationary outer member 27a, and an inner member 27b disposed inside the outer member 27a. The inner member 27b is connected to a rotor 29 formed integrally with the ring gear 24 by a one-way clutch 28.

An exciting coil 27c is attached to the inner circumference of the outer member 27a. When the exciting coil 27c is energized, magnetic powder filled in a space between the outer member 27a and the inner member 27b is magnetized to lock together the outer member 27a and the inner member 27b. Consequently, the inner member 27b, the rotor 29 and the ring gear 24 are fixed. The ECU 10 controls the electromagnetic brake 27. The planet pinion carrier 25 of the transmission 20 is connected to the crankshaft 1a of the internal combustion engine 1.

An endless belt 30 is extended around a pulley 22b mounted on the shaft 22a of the sun gear 22, a pulley 4b mounted on the drive shaft $4a$ of the starting motor 4, and pulleys $5b$, $6b$ and $7b$ respectively mounted on the drive shafts $5a$, $6a$ and $7a$ of the accessories 5, 6 and 7 for power transmission.

A control procedure to be carried out by the ECU 10, i.e., a controller, of the automotive internal combustion engine control system in the first embodiment will be described with reference to flow charts shown in FIGS. 2 and 3. The control procedure is carried out in a state where the ignition switch 8 is closed.

Figure 2:
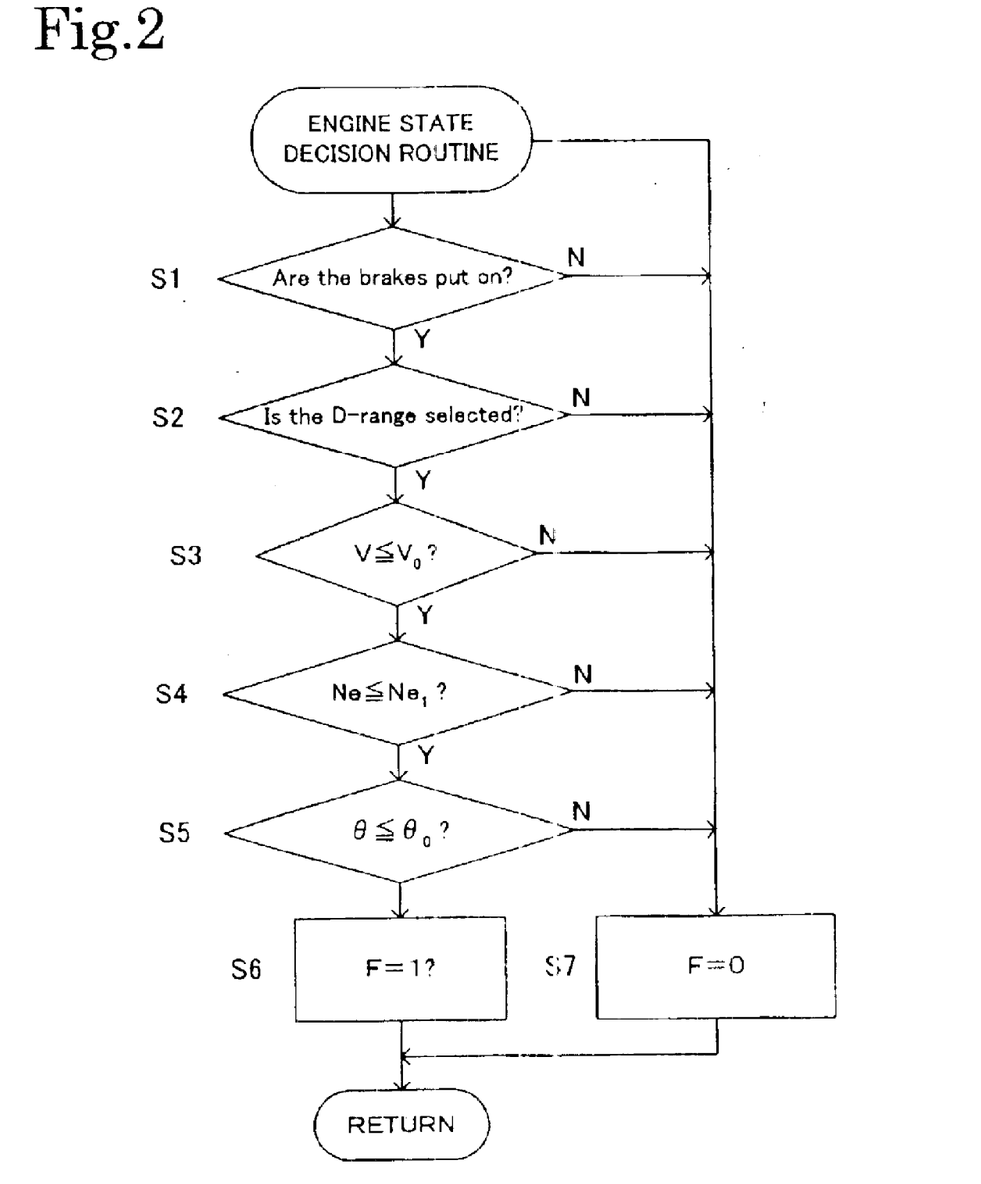
FIG. 2 is a flow chart of an engine state decision routine to be carried out by the automotive internal combustion engine control system shown in FIG. 1.

Referring to FIG. 2 showing a flow chart of an engine state decision routine, a query is made in step S1 to see if the brakes are put on. If the brakes are not put on, the routine jumps to step S7. If the brakes are put on, a query is made in step S2 to see if a D-range is selected. If the response in step S2 is negative, the routine jumps to step S7. If the response in step S2 is affirmative, a query is made in step S3 to see if the traveling speed V of the vehicle is equal to or lower than a predetermined traveling speed $V_0$, which is substantially zero. If the response in step S3 is negative, the routine jumps to step S7. If the response in step S3 is affirmative, a query is made in step S4 to see if the engine speed Ne is equal to or lower than a predetermined engine speed $Ne_1$ not higher than about 900 rpm. If the response in step S4 is negative, the routine jumps to step S7. If the response in step S4 is affirmative, a query is made in step S5 to see if the throttle opening angle $\theta$ is equal to or smaller than a predetermined throttle opening angle $\theta_0$. If the response in step S5 is negative, the routine jumps to step S7. If the response in step S5 is affirmative, an engine state decision flag F is set to the 1 state to permit stopping the internal combustion engine 1. In step S7, the engine state decision flag is set to the 0 state to prohibit stopping the internal combustion engine 1.

When the brake pedal is depressed, the D-range is selected, the vehicle is stopped or virtually stopped, the engine speed Ne is not higher than about 900 rpm, and the accelerator pedal is not depressed to set the throttle opening angle substantially to zero, the engine state decision flag F is set to the 1 state to permit stopping the internal combustion engine 1. If even one of those conditions are not met, the engine state decision flag F is set to the 0 state to prohibit stopping the internal combustion engine 1. All the foregoing conditions are met, for example, when the vehicle is waiting for the traffic lights to change or the vehicle is compelled to stop frequently by traffic congestion.

Figure 3:
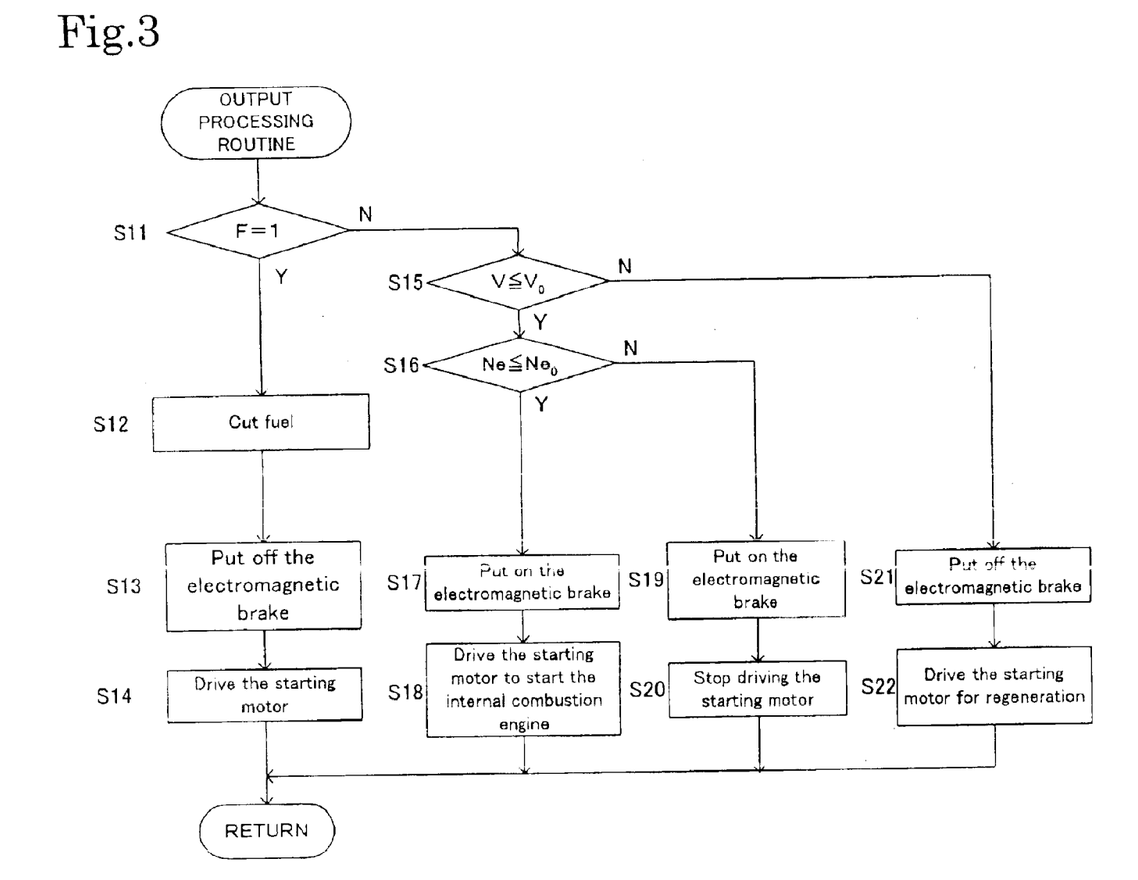
FIG. 3 is a flow chart of an output processing routine to be carried our by the automotive internal combustion engine control system shown in FIG. 1.

Referring to FIG. 3 showing an output processing routine, a query is made in step S11 to see if the engine state decision flag F is set to the 1 state. If the response in step S11 is affirmative, a fuel cutting operation is carried out to stop the internal combustion engine 1 in step S12, the electromagnetic brake 27 is put off in step S13, and the starting motor 4 is driven in step S14. Thus, the internal combustion engine 1 is stopped and fuel consumption can be reduced when the vehicle is stopped, for example, to wait for the traffic lights to change.

In this state, the electromagnetic brake 27 is put off to release the ring gear 24 so that the starting motor 4 is disconnected from the internal combustion engine 1, and then the starting motor 4 is driven. Thus, an unnecessary load, i.e., the internal combustion engine 1, is removed from the starting motor 4, the accessories, particularly, the air conditioner 5 can be driven through the belt 30 by the starting motor 4. Therefore, even while the vehicle is operated in congested traffic in summer, the air conditioner 5 can be continuously operated to keep the passenger compartment in a pleasant condition.

When the brakes are put off, the engine state decision routine sets the engine state flag F to the 0 state to prohibit stopping the internal combustion engine 1. In this state, the response in step S11 is negative, i.e., F≠1, a query is made in step S15 to see if the traveling speed V is equal to or lower than the predetermined traveling speed $V_0$. If the response in step s15 is negative, the routine jumps to step S21. If the response in step S15 is affirmative, a query is made in step s16 to see if the engine speed Ne is equal to or lower than the predetermined engine speed $Ne_0$, which is approximately 0 rpm. If the response in step S16 is negative, the routine jumps to step S19. If the response in step S16 is affirmative step S17 is executed. In step S17, the electromagnetic brake 27 is put on to fix the inner member $27b$. Consequently, the output of the starting motor 4 is transmitted through the planetary gearset 21 to the crankshaft $1a$ of the internal combustion engine 1 to start the internal combustion engine 1 in step S18.

When the inner member $27b$ of the electromagnetic brake 27 is fixed, the one-way clutch 28 prohibits the rotation of the ring gear 24 in one direction. Therefore, the rotation of the sun gear 22 driven for rotation through the belt 30 by the starting motor 4 causes the planet pinions 23 to revolve around the sun gear 22, the planet pinion carrier 25 is rotated, the crankshaft $1a$ connected to the planet pinion carrier 25 is rotated and, consequently, the internal combustion engine is started. In this state, the planetary gear set 21 transmits power at the high first gear ratio. since a rotating speed obtained by reducing the rotating speed of the drive shaft of the starting motor 4 is transmitted to the crankshaft $1a$, a driving force obtained by multiplying the output driving force of the starting motor 4 by the high gear ratio can be used for starting the internal combustion engine 1 and hence the starting motor 4 may be of a small capacity.

When the internal combustion engine 1 is thus started and the engine speed Ne increases beyond the predetermined engine speed $Ne_0$, the routine goes from step S16 to step S19. The electromagnetic brake 27 is put on in step S16 and the driving of the starting motor 4 is stopped in step S20. When the traveling speed V of the vehicle increases beyond the predetermined traveling speed $V_0$, the routine jumps from step S15 to step S21. The electromagnetic brake 27 is put off in step S21. In this state, the engine speed has increased, the centrifugal clutch 26 is engaged, and the planetary gearset 21 is set for the second gear ratio, such as a gear ratio of 1.0. Consequently, the rotation of the crankshaft $1a$ is transmitted directly to the shaft $22a$ of the sun gear 22.

Power thus transmitted at the gear ratio of 1.0 to the pulley $22b$ mounted on the shaft $22a$ of the sun gear 22 is transmitted through the belt 30 to the starting motor 4. The starting motor 4 is thus driven in step S22 to operate as a generator for energy regeneration. Energy generated by the starting motor 4 is stored in the battery 9. Since the power of the internal combustion engine 1 is transmitted to the starting motor 4 at the low second gear ratio to drive the starting motor 4, energy can be efficiently regenerated.

Condition for the engagement of the centrifugal clutch 26 is determined as follows. The electromagnetic brake 27 is put on to drive the crankshaft $1a$ of the internal combustion engine 1 through the planetary gearset 21 by the starting motor 4. Centrifugal force acting on the swing weights $26a$ rises as the engine speed increases and, at the same time, the thrust force generated in the helical gear mechanism of the planetary gearset 21 decreases. The weight of the swing weights $26a$ of the centrifugal clutch 26 and the helix angle of the helical gears of the helical gear mechanism of the planetary gearset 21 are determined such that, after the engine speed has been stabilized at an idling speed of, for example, 700 rpm, the increasing centrifugal force and the decreasing thrust force coincide with each other and the centrifugal clutch 26 is engaged.

Although the centrifugal clutch 26 can be disengaged by the resilience of a return spring or the like. If a return spring is used for such a purpose, the return spring must have a considerably high spring constant, heavy swing weights are needed and a large, heavy device will be necessary.

When the thrust force generated in the helical gear mechanism of the planetary gearset 21 is used, the centrifugal clutch 26 can be surely held in a disengaged state when the starting motor 4 is driven to start the internal combustion engine 1. Therefore, the device is not enlarged and can be formed in lightweight, compact construction.

Basically, the thrust force is generated in the helical gear mechanism by the output torque of the starting motor 4 when the internal combustion engine is started, and the thrust force becomes unnecessary after the engine speed has exceeded the idling speed.

A preset torque applying spring may be incorporated into the centrifugal clutch to increase the capacity of the centrifugal clutch. In such a case also, the thrust force generated in the helical gear mechanism can be effectively used for disengaging the centrifugal clutch.

The automotive internal combustion engine control system including the mechanical module, i.e., the transmission mechanism 20 including the planetary gearset 21 and the centrifugal clutch 26, is simple and convenient.

An automotive internal combustion engine control system in a second embodiment of the present invention will be described with reference to FIGS. 4 to 7. The automotive internal combustion engine control system in the second embodiment is the same in basic construction as the automotive internal combustion engine control system in the first embodiment. The automotive internal combustion engine control system in the second embodiment is provided with a planetary gearset 51 partly different from the planetary gearset 21, a centrifugal clutch 52 included in a transmission 50 and different from the centrifugal clutch 26, and an additional deceleration regeneration mechanism 60. In the following description, parts and members like or corresponding to those of the first embodiment are denoted by the same reference characters.

The planetary gearset 51 is provided with a centrifugal clutch 52. The centrifugal clutch 52 includes a clutch guide 52b interlocked with a planet pinion carrier 25 included in the planetary gearset 51 by splines, and swing weights 52a interposed between the clutch guide 52b and a sun gear 22 included in the planetary gearset 51 and capable of revolving together with the planet pinion carrier 25 and the clutch guide 52b. The swing weights 52a are turned by centrifugal force to shift the clutch guide 52b in a first axial direction, i.e., toward the left, as viewed in FIG. 4, so that the centrifugal clutch 52 is engaged.

Figure 4:
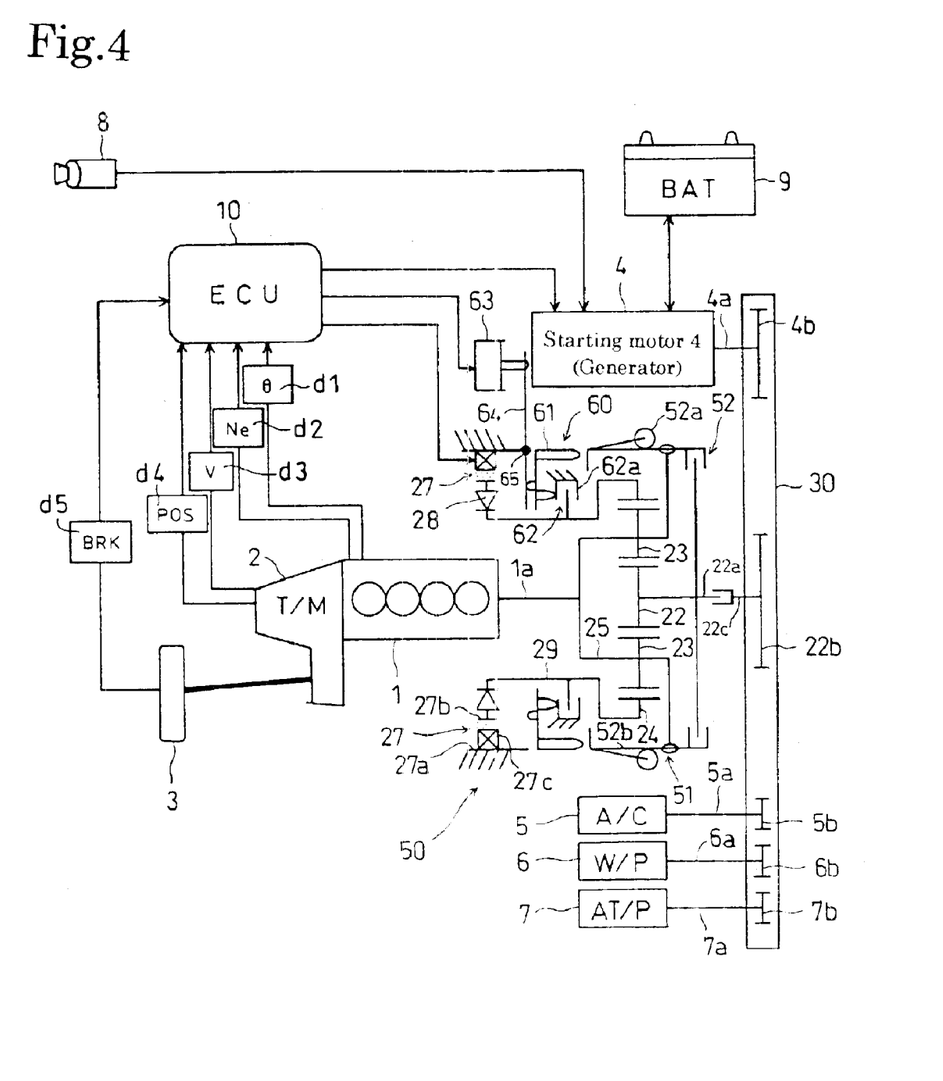
FIG. 4 is a diagrammatic view of an automotive internal combustion engine control system in a second embodiment according to the present invention.

The planetary gearset 51 has a helical gear mechanism including the sun gear 22, planet pinions 23 and a ring gear 24. The sun gear 22, the planet pinions 23 and the ring gear 24 are helical gears. Thrust force generated in the helical gear mechanism acts on the sun gear 22 to shift the sun gear 22 in a second axial direction, i.e., a direction for disengaging the centrifugal clutch 52, relative to the planet pinions 23 and the ring gear 24. The shaft 22a of the sun gear 22 and the shaft 22c of a pulley 22b are interlocked by splines. Thus, the sun gear 22 is able to move axially without causing the pulley 22b to move, and the rotation of the sun gear 22 can be transmitted to the pulley 22b.

The deceleration regeneration mechanism 60 includes a swing lever 64 supported for pivoting about a fulcrum 65. The swing lever 64 is turned by an actuator 63, such as a solenoid or hydraulic actuator, that acts on one end of the swing lever 64. When the swing lever 64 is turned by the actuator 63, the other end of the swing lever 64 moves a piston 61. The piston 61 moves the clutch guide 52b axially to the right, as viewed in FIG. 4, and, at the same time, a fixing clutch 62 for connecting and disconnecting a sliding member 62a formed integrally with the piston 61, and a rotor 29 formed integrally with the ring gear 24 is engaged.

The sliding member 62a of the fixing clutch 62 is able to slide axially and is retrained from rotation. When the sliding member 62a is engaged with another member on the side of the ring gear 24, the rotation of the ring gear 24 is stopped and the ring gear 24 is fixed.

Although the piston needs to exert force of a certain magnitude to shift the carrier 25 and the sliding member 62a, the actuator 63 does not need to exert high operating force and may be of a small capacity because the operating force of the actuator 63 is multiplied by the leverage of the swing lever 64. The actuator 63 of the deceleration regeneration mechanism 60 is controlled on the basis of throttle opening angle by an ECU 10.

The automotive internal combustion engine control system in the second embodiment is identical with the automotive internal combustion engine control system in the first embodiment, except that the former is provided with the transmission mechanism 50 having the centrifugal clutch 52 and the deceleration regeneration mechanism 60. The control procedure to be carried out when the traveling speed V is not higher than the predetermined traveling speed $V_0$ by the ECU 10 of the automotive internal combustion engine control system in the second embodiment is the same as that to be carried out by the automotive internal combustion engine control system in the first embodiment.

The automotive internal combustion engine control system in the second embodiment carries out the engine state decision routine shown in FIG. 2, and steps S11 to S20 of the output processing routine shown in FIG. 3.

Figure 5:
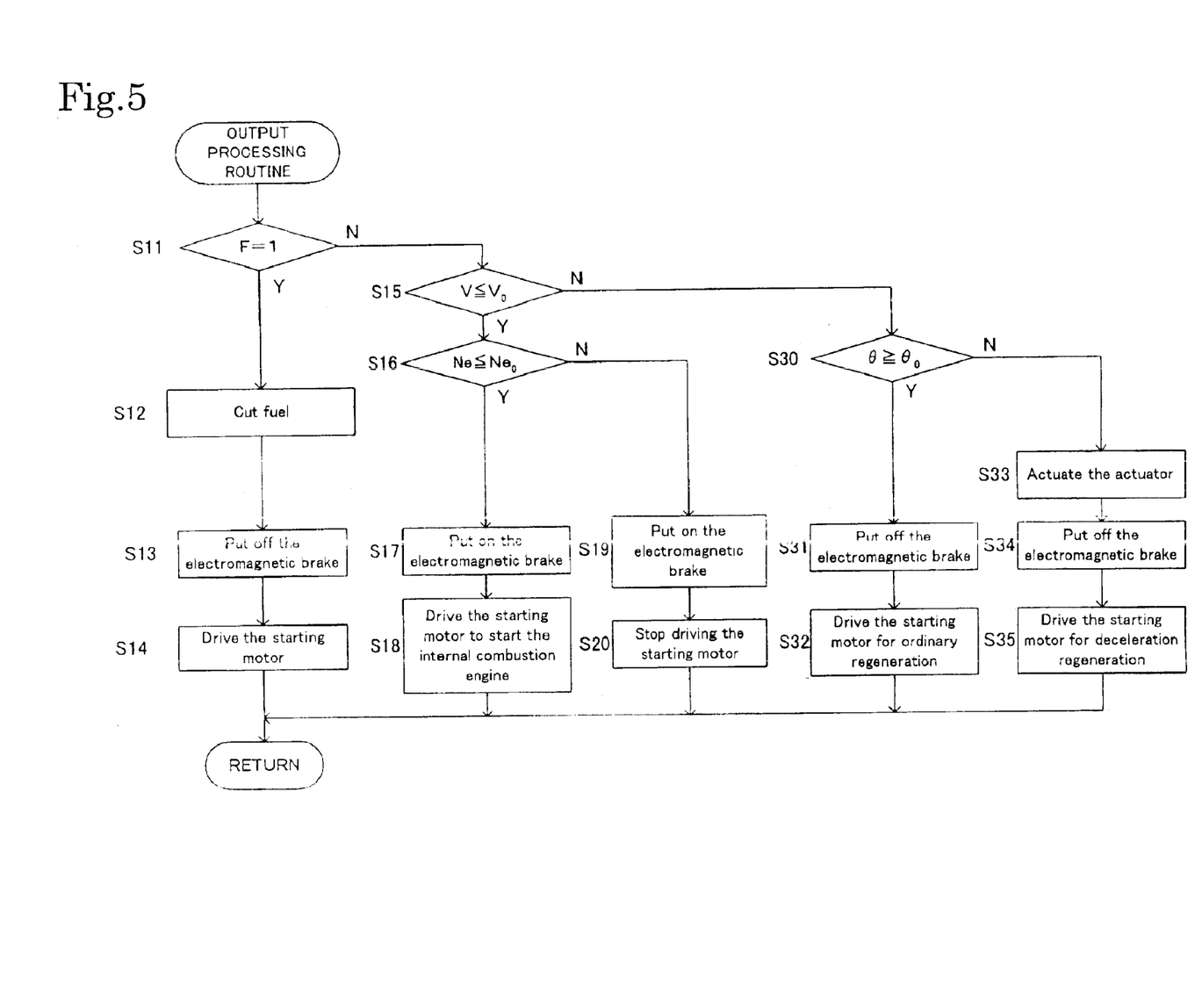
FIG. 5 is a flow chart of an output processing routine to be carried our by the automotive internal combustion engine control system shown in FIG. 4.

Referring to FIG. 5 showing an output processing routine to be carried out by the engine state decision routine in the second embodiment, in which steps S11 to S20 are the same as those of the output processing routine shown in FIG. 3, the starting motor 4 is actuated to start the internal combustion engine 1 when the brake pedal is released to put off the brakes after the vehicle has been temporarily stopped and the internal combustion engine 1 is stopped in step S12. It is decided that the traveling speed V is higher than the predetermined traveling speed $V_0$ in step S15 after the accelerator pedal has been depressed and the vehicle has started traveling, and the output processing routine jumps to step S30. A query is made in step S30 to see if $\theta \geq \theta_0$. Since the accelerator pedal is depressed, $\theta \geq \theta_0$. Then, step S31 is executed, the electromagnetic brake 27 is put off in step S32 to use the starting motor 4 as a generator.

Figure 6:
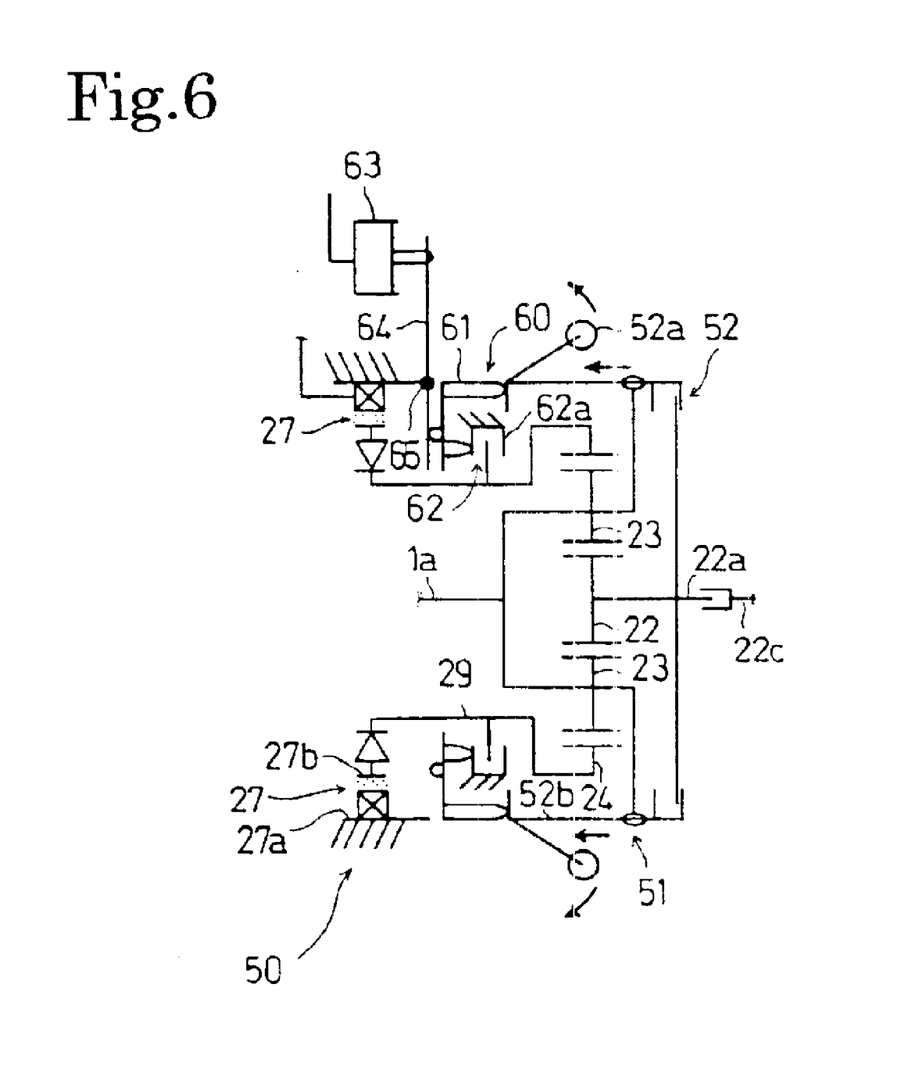
FIG. 6 is a diagrammatic view of a transmission mechanism in a state for ordinary regeneration.

As the engine speed Ne increases, the swing weights 52a of the centrifugal clutch 52 are turned. Consequently, the clutch guide 52b interlocked with the planet pinion carrier 25 by the splines as shown in FIG. 6 is shifted axially to the left, as viewed in FIG. 6, to engage the centrifugal clutch 62.

The weight of the swing weights 52a of the centrifugal clutch 52 and the helix angle of the helical gears of the helical gear mechanism of the planetary gearset 51, similarly to those of the first embodiment, are determined such that the centrifugal clutch 52 is engaged after the engine speed Ne has increased beyond an idling speed.

After the centrifugal clutch 52 has been engaged to connect the planet pinion carrier 25 and the sun gear 22 by the clutch guide 52b, the planetary gearset 51 rotates because the electromagnetic brake 27 is put off. Thus, the rotation of the crankshaft 1a is transmitted directly to the shaft 22a of the sun gear 22 at the second gear ratio of 1.0. The power of the pulley 22b rotating together with the sun gear 22 is transmitted through the belt 30 to the starting motor to drive the starting motor 4 for ordinary regenerative power generation. Thus, the starting motor 4 operates as a generator for ordinary regeneration in step S32 while the accelerator pedal is operated for ordinary traveling.

Figure 7:
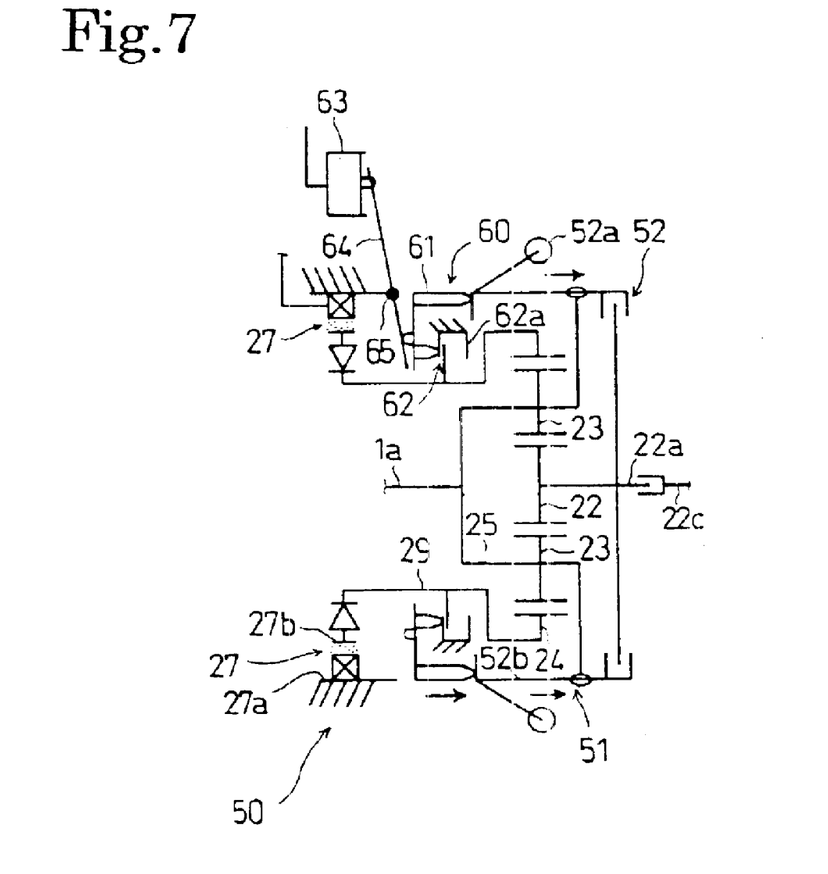
FIG. 7 is a diagrammatic view of a transmission mechanism in a state for deceleration regeneration.

When the accelerator pedal is released for deceleration, the throttle opening angle θ decreases substantially to zero below the predetermined throttle opening angle $θ_0$, and the routine jumps from S30 to S33. In step S33, the actuator 63 is actuated to turn the swing lever 64 as shown in FIG. 7 to shift the piston 61 axially to the right, as viewed in FIG. 7, and the electromagnetic brake 27 is kept put off in step S34.

The centrifugal clutch 52 is engaged by the centrifugal force acting on the swing weights 52a, the clutch guide 52b is shifted to the right by the piston 61 to disengage the centrifugal clutch 52 forcibly and, at the same time, the piston 61 shifts the sliding member 62a of the fixing clutch 62 to the right to engage the fixing clutch 62, whereby the ring gear 24 is fixed. Since the ring gear 24 is fixed, power transmitted from the crankshaft 1a to the planet pinion carrier 25 is transmitted at the high first gear ratio to the sun gear 22. The rotating speed of the crankshaft 1a is increased to that of the sun gear 22.

The rotation of the sun gear 22 rotating at an increased rotating speed is transmitted through the pulley 22b and the belt 30 to the starting motor 4. Then, the starting motor 4 operates as a generator to regenerate a large quantity of energy in step S35.

The automotive internal combustion engine control system including the mechanical module, i.e., the transmission mechanism 50 including the planetary gearset 51, the centrifugal clutch 52 and the deceleration regeneration mechanism 60 is simple and convenient.

Although the second embodiment controls the actuator 63 according to the throttle opening angle θ, the actuator 63 may be controlled according to negative pressure in a part on the downstream side of the throttle valve or the actuator 63 may be directly driven by the negative pressure. When the negative pressure is used for driving the actuator 63, the piston 61 can be moved by a low force produced by the actuator 63 by the negative pressure to shift the planet pinion carrier 25 and the sliding member 62a by using the leverage of the swing lever 64.

The deceleration regeneration mechanism 60 can be applied to the automotive internal combustion engine control system in the first embodiment. However, the automotive internal combustion engine control system must be additionally provided with a piston for making the one-way clutch ineffective and fixing the ring gear 24, and a piston for shifting the clutch guide 26b in a disengaging direction to use the deceleration regeneration mechanism 60, which requires many additional parts.

In the second embodiment provided with the centrifugal clutch 52 disposed between the sun gear 22 and the planet pinion carrier 25, fixation of the ring gear 24 and disengagement of the clutch guide 52b can be achieved by the movement of the single piston 61, and hence the automotive internal combustion engine control system needs a small number of parts and is simple in construction.

Although the planet pinion carrier of the planetary gearset is connected to the crankshaft of the internal combustion engine and the sun gear is connected to the side of the starting motor in the transmission mechanism of the foregoing embodiments, the ring gear may be connected instead of the sun gear to the side of the starting motor. In such a case, the transmission mechanism is formed such that the sun gear can be connected through the one-way clutch and the electromagnetic brake for the same effects as those of the foregoing embodiments.

What is claimed is:

1. An automotive internal combustion engine control system comprising:

a transmission mechanism that transmits output of a starting motor to an internal combustion engine to start the internal combustion engine, transmits output of the internal combustion engine to an auxiliary machinery while the internal combustion engine is in operation, and transmits output of the starting motor to the auxiliary machinery while the internal combustion engine is stopped for a predetermined condition, wherein:

the starting motor is operable as a generator, a controller controls the transmission mechanism to transmit rotation of a drive shaft included in the starting motor to a crankshaft included in the internal combustion engine at a high first gear ratio in starting the internal combustion engine, and to transmit rotation of the crankshaft of the internal combustion engine to the drive shaft of the starting motor at a low second gear ratio while the internal combustion engine is in operation, and the starting motor serves as a generator when the rotation of the crankshaft of the internal combustion engine is transmitted to the drive shaft of the starting motor at the second gear ratio, wherein the transmission mechanism includes a brake that is put on by a signal given thereto by the controller to transmit the rotation of the drive shaft of the starting motor to the crankshaft of the internal combustion engine at the high first gear ratio in starting the internal combustion engine, and is put off when traveling speed of an associated vehicle increases beyond a predetermined traveling speed after the internal combustion engine has been started.

2. The automotive internal combustion engine control system according to claim 1, wherein the transmission mechanism includes a centrifugal clutch that is engaged upon the increase of engine speed of the internal combustion engine to a predetermined engine speed to transmit the rotation of the crankshaft of the internal combustion engine to the drive shaft of the starting motor at the low second gear ratio.

3. The automotive internal combustion engine control system according to claim 1, wherein the transmission mechanism includes:

a planetary gearset including a helical sun gear connected to the starting motor, helical planet pinions, a helical ring gear connected through a one-way clutch to a stationary member, and a planet-pinion carrier carrying the planet pinions and connected to the crankshaft of the internal combustion engine; and a centrifugal clutch that engages the planet pinion carrier and the sun gear by the agency of centrifugal force acting on weights, and disengages the planet pinion carrier and the sun gear from each other by thrust force generated by the helical gears.

4. The automotive internal combustion engine control system according to claim 3 further comprising a controllable braking means placed between the one-way clutch and the stationary member;

wherein the controllable braking means intercepts the transmission of the output of the starting motor to the internal combustion engine while the internal combustion engine is stopped for a predetermined condition.

5. The automotive internal combustion engine control system according to claim 3 further comprising a deceleration regeneration means for locking the ring gear by forcibly disengaging the centrifugal clutch;

wherein the deceleration regeneration means transmits the rotation of the crankshaft of the internal combustion engine to the drive shaft of the starting motor at the high first gear ratio while the vehicle is being decelerated to use the starting motor as a generator for regeneration.

6. The automotive internal combustion engine control system according to claim 5, wherein the deceleration regeneration means includes:

an actuator that operates when the vehicle starts deceleration; and a swing lever supported for turning about a fulcrum, and having a first end to which operating force of the actuator is applied, and a second end that is moved when the actuator applies a force to the first end to exert force obtained by multiplying the force applied by the actuator to the first end by a leverage.

7. The automotive internal combustion engine control system according to claim 1, wherein said brake is put off when a throttle opening angle increases beyond a predetermined throttle opening angle after the internal combustion engine has been started.

8. An automotive internal combustion engine control system comprising:

a transmission mechanism that transmits output of a starting motor to an internal combustion engine to start the internal combustion engine, transmits output of the internal combustion engine to an auxiliary machinery while the internal combustion engine is in operation, and transmits output of the starting motor to the auxiliary machinery while the internal combustion engine is stopped for a predetermined condition, wherein:

the starting motor is operable as a generator, a controller controls the transmission mechanism to transmit rotation of a drive shaft included in the starting motor to a crankshaft included in the internal combustion engine at a high first gear ratio in starting the internal combustion engine, and to transmit rotation of the crankshaft of the internal combustion engine to the drive shaft of the starting motor at a low second gear ratio while the internal combustion engine is in operation, and the starting motor serves as a generator when the rotation of the crankshaft of the internal combustion engine is transmitted to the drive shaft of the starting motor at the second gear ratio, wherein the transmission mechanism includes:

a planetary gearset including a helical sun gear connected to the starting motor, helical planet pinions, a helical ring gear connected through a one-way clutch to a stationary member, and a planet-pinion carrier carrying the planet pinions and connected to the crankshaft of the internal combustion engine; and a centrifugal clutch that engages the planet pinion carrier and the ring gear by the agency of centrifugal force acting on weights, and disengages the planet pinion carrier and the ring gear from each other by thrust force generated by the helical gears.

9. The automotive internal combustion engine control system according to claim 8, further comprising a controllable braking means placed between the one-way clutch and the stationary member;

wherein the controllable braking means intercepts the transmission of the output of the starting motor to the internal combustion engine while the internal combustion engine is stopped for a predetermined condition.

10. An automotive internal combustion engine control system comprising:

a transmission mechanism that transmits output of a starting motor to an internal combustion engine to start the internal combustion engine, transmits output of the internal combustion engine to an auxiliary machinery while the internal combustion engine is in operation, and transmits output of the starting motor to the auxiliary machinery while the internal combustion engine is stopped for a predetermined condition:

wherein the starting motor is operable as a generator, a controller is operative to control the transmission mechanism to transmit rotation of a drive shaft included in the starting motor to a crankshaft included in the internal combustion engine at a high first gear ration in starting the internal combustion engine, and to transmit rotation of the crankshaft of the internal combustion engine to a drive shaft of the starting motor at a low second gear ratio while the internal combustion engine is in operation, and the starting motor serves as a generator when the rotation of the crankshaft of the internal combustion engine is transmitted to the drive shaft of the starting motor at the second gear ratio, and wherein the transmission mechanism includes:

a planetary gear set including a helical sun gear connected to the starting motor, helical planet pinions, a helical ring gear connected through a one-way clutch to a stationary member, and a planet-pinion carrier carrying the planet pinions and connected to the crankshaft of the internal combustion engine; and a centrifugal clutch that engages the planet pinion carrier and the ring gear by the agency of centrifugal force acting on weights, and disengages the planet pinion carrier and the ring gear from each other by thrust force generated by the helical gears.

11. The automotive internal combustion engine control system according to claim 10, further comprising:

a controllable braking means placed between the one-way clutch and the stationary member, said controllable braking means being operative to interception the transmission of the output of the starting motor to the internal combustion engine while the internal combustion engine while the internal combustion engine is stopped for a predetermined condition.

* * * * *